United States Patent
Nemchick et al.

(10) Patent No.: US 6,673,187 B2
(45) Date of Patent: Jan. 6, 2004

(54) METHOD FOR EDGE WRAPPING AN AIRCRAFT INTERIOR PANEL

(75) Inventors: John D. Nemchick, Stanwood, WA (US); Don C. Jones, Marysville, WA (US)

(73) Assignee: The Boeing Company, Seattle, WA (US)

( * ) Notice: Subject to any disclaimer, the term of this patent is extended or adjusted under 35 U.S.C. 154(b) by 226 days.

(21) Appl. No.: 09/972,483

(22) Filed: Oct. 5, 2001

(65) Prior Publication Data

US 2002/0112817 A1 Aug. 22, 2002

Related U.S. Application Data

(60) Provisional application No. 60/239,065, filed on Oct. 7, 2000.

(51) Int. Cl.[7] .................. B32B 31/00; B32B 31/04; B32B 31/20
(52) U.S. Cl. ............. 156/213; 156/212; 156/216; 156/285
(58) Field of Search .................. 156/212, 213, 156/216, 285, 382, 443, 475, 493

(56) References Cited

U.S. PATENT DOCUMENTS

| | | | | | |
|---|---|---|---|---|---|
| 1,971,384 | A | * | 8/1934 | Ritter | 156/213 |
| 1,980,022 | A | * | 11/1934 | Whitehouse | 156/213 |
| 2,049,970 | A | * | 8/1936 | Mitchell | 156/216 |
| 3,325,329 | A | * | 6/1967 | Bolesky | 156/216 |
| 3,551,239 | A | * | 12/1970 | Newton | 156/213 |

FOREIGN PATENT DOCUMENTS

| | | | | | |
|---|---|---|---|---|---|
| JP | 05220830 | A | * | 8/1993 | 156/212 |

* cited by examiner

Primary Examiner—Adrienne C. Johnstone
(74) Attorney, Agent, or Firm—John C. Hammar

(57) ABSTRACT

An edge wrap machine for applying decorative laminate to an aircraft interior panel, particularly a stowbin door, lifts the edge to be wrapped with an actuator, wraps the edge automatically by drawing a vacuum between two silicone blankets sandwiching the panel, and lowers the actuator to achieve bonding pressure on the wrapped edge. The machine automates a hand operation that is relatively slow and potentially dangerous to the workers.

1 Claim, 4 Drawing Sheets

METHOD FOR EDGE WRAPPING AN AIRCRAFT INTERIOR PANEL

REFERENCE TO RELATED APPLICATIONS

The present application claims the benefit of U.S. Provisional Patent Application No. 60/239,065, filed Oct. 7, 2000.

TECHNICAL FIELD

The present invention relates to a method and apparatus for edge wrapping aircraft interior panels, especially stowbin doors, with TEDLAR decorative laminate.

BACKGROUND OF THE INVENTION

The decorative surface of most interior parts is made of one or two sheets of decorative laminate molded with an embossing resin to give it texture. The decorative laminate is then molded and bonded to the part using a vacuum forming process. Vacuum forming, excess decorative laminate must be wrapped around and bonded to the backside of the panel to provide a good clean edge. This edge wrapping process is currently a relatively slow, hand operation involving heat guns and chemicals.

One method of mitigating edge wrap has been to eliminate it by bonding trim strips to the panels.

Workers applying the laminates today often wear heavy cotton gloves to insulate themselves from the heat of the heat guns and the hot decorative laminate. Some workers also wear respirators to protect from solvent cleaning fumes. There are also ergonomic issues with the stretching and pulling of the decorative laminate, as well pressing the decorative laminate down by hand. This process can cause wrist and arm problems as well as the problems with the heat guns.

During the vacuum forming process a fair amount of excess decorative laminate is needed to allow the decorative to stretch and form around complex curves. Excess decorative laminate is thrown away as waste. Using a silicone blanket allows the decorative laminate to be trimmed to almost net size on the edge wrap side, eliminating waste.

SUMMARY OF THE INVENTION

Automatic edge wrapping during the vacuum forming process uses mechanical actuation on a tool. The actuator raises the tool and the part leaving the edge exposed. A silicone blanket forms a seal on the top. The silicone blanket is sucked tightly to the surface around the edge. An alternative to using the silicone blanket is to use the decorative laminate (TEDLAR) itself as the seal, but care must be taken to avoid tearing or puncture of the decorative laminate.

The seal will usually bridge and make only minimal contact with the backside of the part. To finish the process, the mechanism holding the tool and part up is lowered allowing the decorative laminate to be drawn up on to the back of the part for bonding to pre-applied adhesive on the back of the part in the edge wrap area.

DETAILED DESCRIPTION OF A PREFERRED EMBODIMENT

Figure 1:
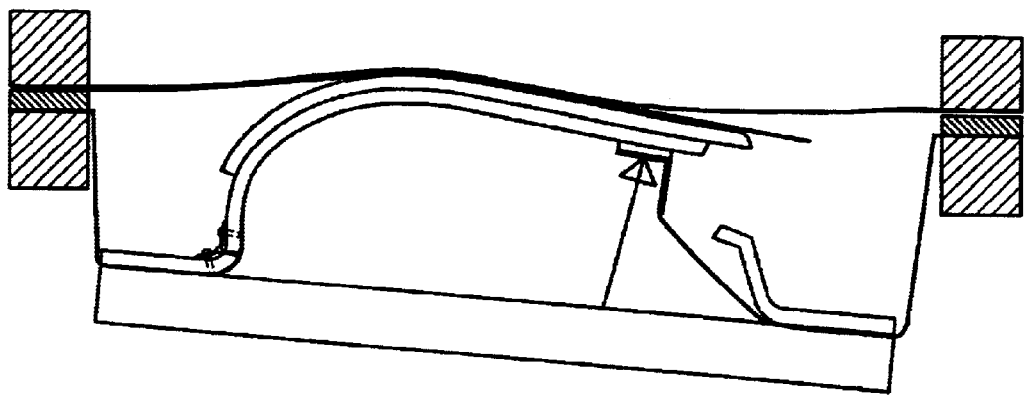
FIG. 1 shows lifting of the edge with a lifting actuator in a vacuum forming press to prepare the edge for application of the decorative laminate.
Figure 2:
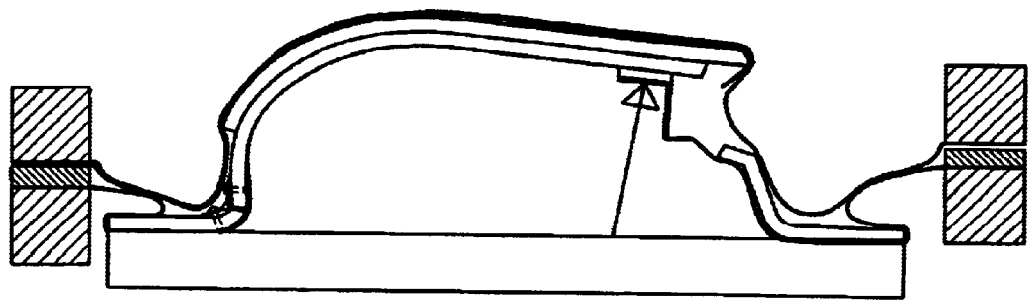
FIG. 2 shows the wrapping of the decorative laminate upon application of suction (i.e., a vacuum).
Figure 3:
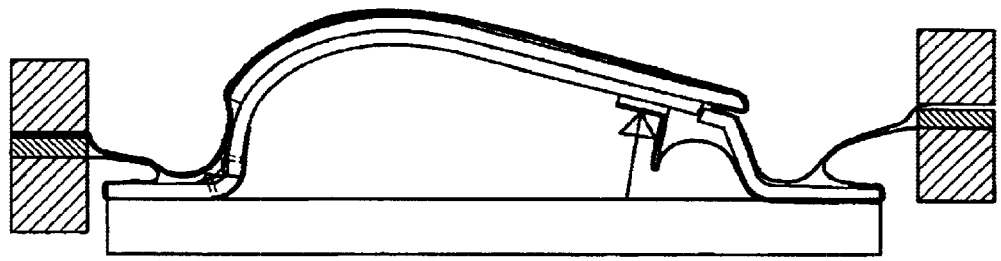
FIG. 3 shows retraction of the lifting actuator to press the decorative laminate onto the back of the panel to complete the edge wrapping.
Figure 4:
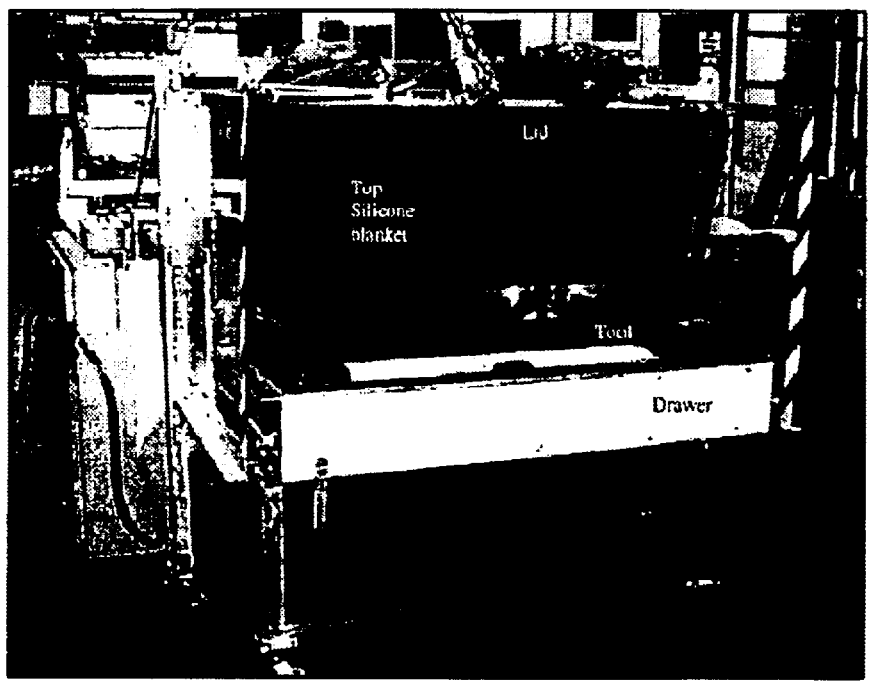
FIG. 4 is a photograph of the preferred edge wrapping machine.
Figure 5:
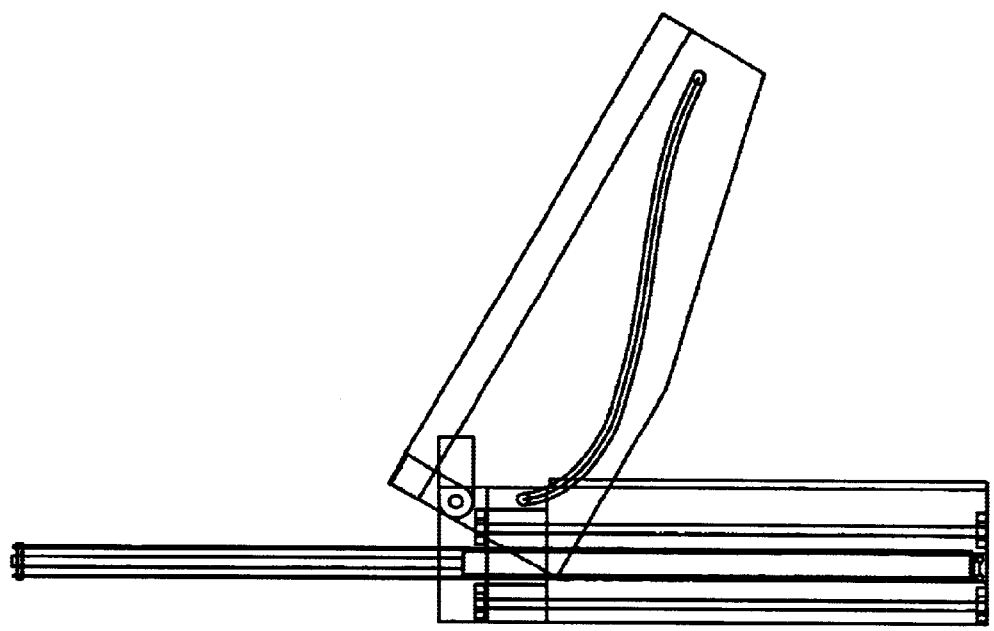
FIG. 5 is a diagram of the lid actuation.
Figure 6:
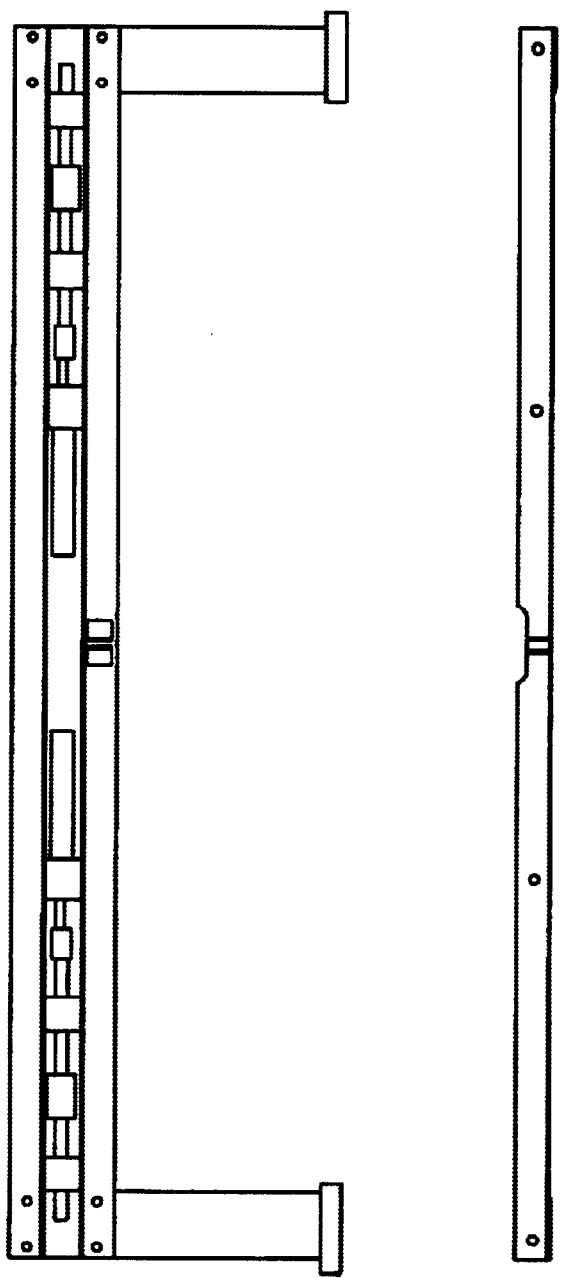
FIG. 6 shows the auto-eject door details.

A Decorative Laminate (Dec-Lam) oven uses ten 500 watt Infrared (IR) lamps to heat the decorative surface making it formable and to cure the adhesive used to bond a decorative laminate to the part. The tooling for the oven incorporates several unique features, including an edge wrap feature and the automation of all processes except loading the part and the laminate.

The Dec-Lam oven requires increased ramp up time because of lower power output on the IR lamps. It uses a silicone blanket. To minimize the use of TEDLAR, the decorative laminate is cut smaller than the oven. To create a vacuum when applying the laminate, the blanket is used.

The part, typically a stowbin door, must be free of pits and debris, as any imperfections in the surface will show through the decorative material. Adhesive is pre-applied to the door, including a ½" strip along the top of the back edge for the edge wrap material. The part is loaded onto the oven indexed to the handle cutout to ensure proper placement and securing from movement.

When the part and decorative laminate are loaded, we remove the previously finished part from the lid of the oven where it is ejected to at the end of the forming process.

When the "start" button is pushed to begin the edge wrapping process in the oven, the auto-eject mechanism is pulled up out of the way. The drawer moves in and the heating process begins. A first set point (SP1) on the controller is set to 330° F. An alarm (AL1) set for a lower temperature of 270° F., triggers a switch on the controller to set set point 2 (SP2). The alarm allows a quicker ramp up to SP1 and good temperature control around SP2. The silicone blanket is heated to 270° F. The decorative laminate beneath is approximately 30° to 40° cooler than blanket. This temperature difference decreases as the vacuum is pulled, because contact of the decorative laminate with blanket increases, increasing conductive heat transfer between the blanket and the laminate.

When the alarm AL1 is triggered, the controller changes to SP2 to cure the adhesive and begins to draw vacuum to form the decorative laminate around the part. After a full vacuum is applied, a vacuum sensor triggers the edge wrap mechanism. The back edge of the door is lowered, allowing the silicone blanket to fully pull around the edge and to wrap the decorative laminate onto the pre-applied adhesive on the back edge. A soak temperature (SP2) is held for five minutes to allow the adhesive to cure. When the cure is complete, the drawer moves out and fans come on for three minutes to cool the part.

When the part is cool, the auto-eject door is lowered, the clamps clamp the part through the silicone blanket, and the vacuum is released. As the vacuum is releasing, the edge wrap mechanism moves up to free any TEDLAR that may have been caught in it. The clamp then opens lifting the part up, while opening the tool for the next part to be loaded.

The oven consists of four major parts: the oven structure and framework, the control box, the IR lamps, and the fixture drawer. The control box contains all the necessary electronics including a Rockwell Automation (Allen-Bradley) programmable logic controller (PLC). The IR lamps provide the heat for the system, and the fixture drawer contains all of the tooling for vacuum forming the decorative laminate to the surface.

The bank of infrared lamps consists of ten G30-500 watt lights. The lights are 120-volt bulbs hooked in series to a 240V circuit giving 5 pair of bulbs. For better performance gold reflectors on each bulb should be cleaned periodically.

The base of the holding fixture in the oven is a fiberglass splash that was taken from the crushed core mold die, and it is undersized. The envelope of the splash should be no more than 21"×48". The splash is approximately 3/8" thick with a 1/4"×2" reinforcement running full length 2" from the back side. On top of this reinforcement, a 2"×2" aluminum angle is bonded and screwed on every 3 inches.

The splash is cut or formed in two parts to accommodate the edge wrap function. It is cut at an angle of approximately 20° one inch from the trailing edge. The other three sides are also cut approximately 1" below the part edge contour. The two parts of the splash are connected together on the front using a piano hinge. The hinge is supported on the contoured part with adhesive dispensed under the hinge when it is screwed to the part.

A flexible base is used to hold the fiberglass fixture. A heavy-duty silicone blanket (0.06") is used to hold the base. The blanket is bonded to the center cut out section of the tool over the cuts. The blanket may be cut and folded as necessary to conform to the contours of the part ensuring that all cuts are sealed. The blanket is bonded using a silicone RTV adhesive (BAC5010 type 60). The back edge is bonded over the aluminum reinforcement to hold the blanket out of the opening during the edge-wrap operation. The silicone needs to be kept out of the opening on the sides as well. A piece of aluminum, 0.03" thick, is used to hold the blanket inside. This aluminum is bonded to the center and slides inside the outer section of the tool.

The silicone blanket is bonded to a perimeter plate. The fiberglass splash is positioned in the box 4" from the top of the compression pad in the front (3.5" from the frame) and 5.25" in the back (4.75" from the frame).

On the lower side of the tool fixture are the mechanisms that operate the edge wrap function. Two 1½" Bimba (BFT-172-D) air cylinders actuate the edge-wrap. Because these cylinders are not strong enough to hold the mechanism up directly, a scissor mechanism is used which provides a large mechanical advantage. Care must be taken with the scissor mechanism when assembling. If the scissor is adjusted such that the center pin is beyond the line of force, the actuator will not have the force necessary to draw it back and to close the edge wrap. The lines from the top pin to the center pin and the center pin to the actuator frame pin should make about a 175° to 178° angle on the side opposite the actuator.

The supports consist of two sets of 2"×2"×1/8" aluminum angles facing back to back to hold the actuator and scissor mechanism. For clearance purposes a 1/4" shim is used at either end. When the supports are bolted on, the bolts must go through the silicone blanket and fiberglass splash. Care must be taken to ensure that all leaks are eliminated sealing the bolts and between the fiberglass and silicone.

Because proximity sensors are used on the right actuator, an aluminum tab must be included on the actuator head. Because of this, the right clevis actuator end is made 1/8" shorter to accommodate it.

When assembling the bolt holding the two lower scissor arms and one upper arm must not protrude and interfere with support structure as the edge-wrap is actuated. The bolt through the supports and the two lower scissor arms must have spacers or washers to keep the lower scissor arms the correct distance apart. There are two proximity sensors to detect the up and down positions.

The lid to the vacuum former is closed with a cam and 3/4" roller bearing on a linear actuator. The only force that the actuator must overcome is the friction of the Frelon bearing acting perpendicular to the clamping force. The bearing is guided and supported by two 1/2"×32" precision rods. These rods provide the rigidity and strength to carry the clamping force as the lid closes. Both sides of the lid are actuated independently. The rigidity of the lid itself keeps the actuators in uniform motion. There are three position sensors for the clamp actuation. One sensor tells when the lid is up and the other two are hooked in series to ensure that both sides are fully closed.

A second silicone blanket is used on the top to create the vacuum seal and draw the TEDLAR decorative laminate down around the part. The blanket is bonded to the lower side of the vacuum form lid using BAC5010 type 60 silicone adhesive. The blanket is stretched about one inch lengthwise on the frame to provide a taut blanket. Around the perimeter of the lid a 1/4" radius half-round is bonded on 1.75 inches from the outside to provide a positive interface with the silicone pad on the base. Seams at the corners must be sealed with adhesive to prevent leakage.

The top of the silicone blanket is reinforced in four areas. The two small reinforcements are for extra strength for the auto-eject mechanism, which can wear the blanket surface. The large reinforcement areas are to stiffen the blanket to help the edge-wrap feature. The stiffened material makes a natural transition of the fold line of the blanket at the back edge of the door to the unsupported material. It also prevents the decorative laminate on the side from being pulled in too far and pinching in the edge-wrap mechanism.

The edges of the reinforcement areas are fillet sealed with tapered fillet about 1/2" out around the edge of the reinforcement material. The fillet prevents mark-off on the decorative laminate because of the difference in material thickness and stiffness.

After wrapping the edge, the part is automatically removed from the tool fixture to allow easier loading of the next part. When the next part is loaded, the finished part can be removed and have the excess decorative laminate trimmed off. A mechanism is built into the lid to lift the part up with the lid. The edge-wrap mechanism clamps the part through the silicone blanket while it is still under vacuum. The auto-eject mechanism is attached to the lid with two spring-loaded hinges to allow the mechanism to move out of the way during the vacuum forming process. The mechanism is supported by two 2"×2" aluminum angles spanning the door. It is actuated by two Bimba BFT-042-D pneumatic cylinders. The cylinders actuate two 1/2" rods supported by two Frelon linear bearings. The two clamps actually support the part. The bearing surfaces on the clamps should be padded with silicone foam to protect the blanket as much as possible.

Auto-eject door actuation moves the auto-eject mechanism up out of the way for process operation. The mechanism is screwed to the front center of the door. The actuator (Bimba cylinder MRS-0915-D) moves nearly straight up to stay out the isle. A cable rolling over a cam pulls the door up. When the actuator goes down, the spring-loaded hinges maintain the tension on the cable lowering it to the top of the lid to function. Two magnetic reed switches on the cylinder act as position indicators for up and down.

There are five pneumatic control valves built into the control panel (SV1, SV2, SV3, SV4, and SV5). These control the drawer, auto-eject, auto-eject door, clamp, and edge-wrap actuators. ¼" plastic tubing is the primary line used with simple push in connectors.

Because the tool is on a flexible base that moves up and down operation, there must be adequate free tubing and wires between the drawer and tool base to allow free movement. All lines are run from the back of the drawer to the oven through a rolling track, which protects and guides the lines.

TABLE 1

412A1510-100 Vacuum Forming Machine Parts List

| # | Description | Part number | Mfg./Distributor |
|---|---|---|---|
| 4 | .5" ID × 32 "Precision shaft | 6061K79 | McMaster-Carr |
| 8 | .5" ID base mount shaft support | 6068K23 | McMaster-Carr |
| 4 | .5" ID double length Frelon Bearing | 6374K51 | McMaster-Carr |
| 4 | .5" ID fixed alignment bearing | 5986K83 | McMaster-Carr |
| 2 | .75" OD × .25" ID roller bearing | 6326K51 | McMaster-Carr |
| 4 | 1.5" Flanged track roller | 6318K11 | McMaster-Carr |
| 2 | 12" Circulator Fan | 1936K44 | McMaster-Carr |
| 2 | 3" spring loaded hinge (Stanley) | | Home Depot |
| 9 | .5" D. 3 pin quick connect proximity sensor | BES-516-356-S4-C | BALLUFF/Buchanan Air |
| 9 | 3 pin quick connect cord | BKS S19-1-KU-5 | BALLUFF/Buchanan Air |
| 1 | Vacuum sensor switch | 3116064 | PIAB/Buchanan Air |
| 2 | Infrared temperature sensor | RAYCI1A | Raytek/Buchanan Air |
| 2 | Magnetic reed switch | MRS-.087-BL-09 | Bimba/Buchanan Air |
| 2 | 1¼" D × 25" end mounted air cylinder | 1225-DP | Bimba/Buchanan Air |
| 2 | 1½" D × 2" trunnion mounted cylinder | BFT-172-D | Bimba/Buchanan Air |
| 2 | ¾" D × 2" trunnion mounted cylinder | BFT-042-D | Bimba/Buchanan Air |
| 1 | ¾" D × 32" end mounted air cylinder | 0432-DXP | Bimba/Buchanan Air |
| 1 | 1 1/16" × 15 end mounted magnetic reed switch cylinder | MRS-0915-D | Bimba/Buchanan Air |
| 4 | Mounting bracket | D-129 | Bimba/Buchanan Air |
| 2 | Mounting bracket | D-241 | Bimba/Buchanan Air |
| 2 | Piston Rod Clevis | D-231-1 | Bimba/Buchanan Air |
| 2 | Gleason rolling track 4" × 1.5" × 36" | 162P-IV-3.4 | Gleason Reel/ J. P. Whalen |
| 4 | Gleason track mounting brackets M & F | 162P-IV | Gleason Reel/ J. P. Whalen |
| | .06" gage silicone blanket for base | | |
| | .05" gage silicone blanket for top | | |
| | 1/2" compression foam for seal | | |
| | ¼" and 3/8" Nycoil | | |

TABLE 1-continued

412A1510-100 Vacuum Forming Machine Parts List

| # | Description | Part number | Mfg./Distributor |
|---|---|---|---|
| | tubing | | |
| | Misc. ¼" and 3/8" quick connect fittings | | |
| | Misc. screws, bolts, etc. | | |

The final product of the automatic edge wrap process is essentially the same as that resulting from the manual process. The technical value of the invention comes in the production process through the elimination of excess labor and waste material. The edge wrap process as currently done on the 737 stowage bin doors is, on the average, a 5-minute process. Trimming the excess decorative laminate after it comes out of this machine requires less than 1 minute. This is a 4-minute savings on each door. This reduction in work makes it possible for a single operator to handle all of the machines required to fabricate the stowbin doors in a lean manufacturing work cell, thereby greatly reducing labor cost.

While we have described preferred embodiments, those skilled in the art will readily recognize alterations, variations, and modifications that might be made without departing from the inventive concept. Therefore, interpret the claims liberally with the support of the full range of equivalents known to those ordinary skill based upon this description. The examples illustrate the invention and are not intended to limit it. Accordingly, define the invention with the claims and limit the claims only as necessary in view of the pertinent prior art.

What is claimed is:

1. An edge wrapping method for applying decorative laminate to edges of aircraft interior panels comprising the steps of:

(a) applying adhesive to a back surface of a panel along an edge of the panel;

(b) loading the panel from step (a) and at least one sheet of a decorative laminate into a decorative laminate oven having a movable, translating support for the panel, a silicone blanket for overlying the panel and laminate, and a heater, the oven being capable of forming the sheet onto the panel upon heating of the laminate;

(c) heating the laminate to a set point temperature at which suction is applied in the oven to form the laminate;

(d) translating the support to open a gap so that the silicone blanket wraps the laminate around the edge and into contact with the adhesive on the back surface; and (e) curing the adhesive to bond the laminate to the panel.

* * * * *